United States Patent
Mappus, IV et al.

(10) Patent No.: US 11,902,469 B1
(45) Date of Patent: Feb. 13, 2024

(54) METHOD FOR MANAGING CALL QUEUES FOR RECURRING CUSTOMER QUESTIONS

(71) Applicant: JPMorgan Chase Bank, N.A., New York, NY (US)

(72) Inventors: Rudolph L. Mappus, IV, Plano, TX (US); Sri Harsha Pothukuchi, Brambleton, VA (US); Angel Vincent, Milford, OH (US); Peter Kutchen, Bear, DE (US); Owen Churchill, Columbus, OH (US); Jose Burgos, Dallas, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/901,036

(22) Filed: Sep. 1, 2022

(51) Int. Cl.
| | |
|---|---|
| *H04M 3/523* | (2006.01) |
| *H04M 3/51* | (2006.01) |
| *G10L 15/18* | (2013.01) |
| *G10L 15/187* | (2013.01) |

(52) U.S. Cl.
CPC ........ *H04M 3/5235* (2013.01); *G10L 15/187* (2013.01)

(58) Field of Classification Search
None
See application file for complete search history.

(56) References Cited

U.S. PATENT DOCUMENTS

| | | | | |
|---|---|---|---|---|
| 2003/0195894 A1* | 10/2003 | Powers | ................ | G06Q 10/10 |
| 2009/0161838 A1* | 6/2009 | Schultz | ................... | H04L 65/40 |
| | | | | 379/265.09 |
| 2011/0019812 A1* | 1/2011 | Sankaranarayanan | | ...................... |
| | | | | H04M 3/5237 |
| | | | | 379/266.01 |
| 2011/0243311 A1* | 10/2011 | Aldrich | ............. | G06Q 10/1095 |
| | | | | 704/200 |
| 2014/0211932 A1* | 7/2014 | Zhao | ................... | H04M 3/5175 |
| | | | | 379/265.06 |
| 2014/0314225 A1* | 10/2014 | Riahi | ..................... | H04L 51/02 |
| | | | | 379/265.09 |
| 2019/0287517 A1* | 9/2019 | Green | ................. | H04M 3/2281 |
| 2020/0251116 A1* | 8/2020 | Sachdev | ............. | H04M 3/5175 |

* cited by examiner

*Primary Examiner* — Harry S Hong
(74) *Attorney, Agent, or Firm* — GREENBLUM & BERNSTEIN, P.L.C.

(57) ABSTRACT

Methods and systems for handling telephone calls relating to recurring customer questions and inquiries so as to decrease a likelihood of additional calls regarding the same issues and thereby improve customer experience while reducing an overall call volume are provided. The method includes: receiving an incoming telephone call from a person; capturing an audio signal that corresponds to a voice of the person; analyzing the audio signal by detecting phonetic intonations applying a digital filter to the intonations; and determining whether an inquiry articulated by the person during the telephone call has been adequately addressed. The method may further include using machine learning to generate an output that indicates an expression of certainty or uncertainty in the voice of the person.

13 Claims, 6 Drawing Sheets

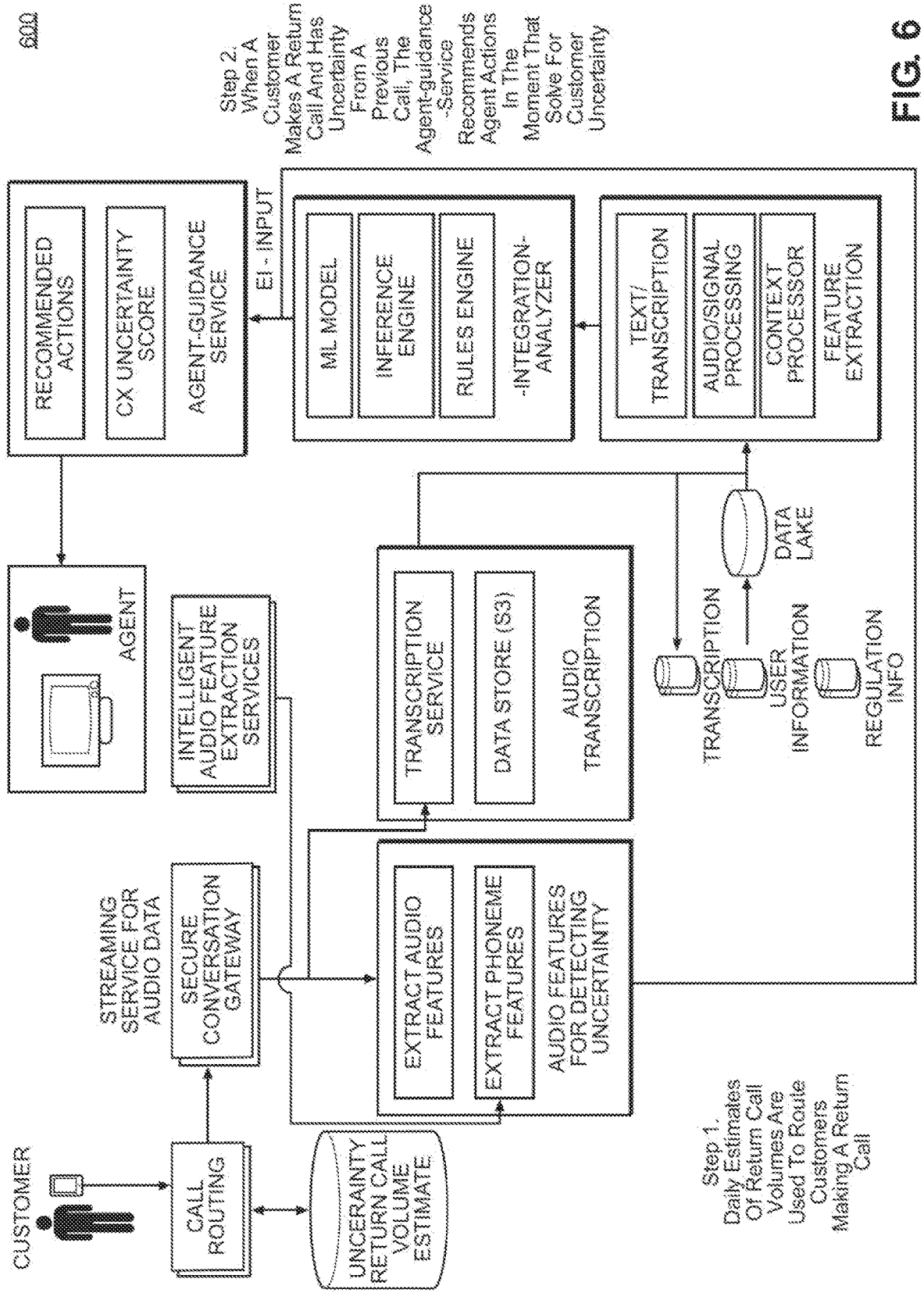

METHOD FOR MANAGING CALL QUEUES FOR RECURRING CUSTOMER QUESTIONS

BACKGROUND

1. Field of the Disclosure

This technology generally relates to methods and systems for handling telephone calls, and more particularly to methods and systems for managing call queues for recurring customer questions and inquiries so as to decrease a likelihood of additional calls regarding the same issues and thereby improve customer experience while reducing an overall call volume.

2. Background Information

Customer calls into a customer services telephone support team represent opportunities to serve a customer. A common business objective for customer support agents is to address all of a particular customer's needs when that particular customer calls.

However, addressing all customer needs is a challenge for a telephone service specialist. For example, in the case of a customer services telephone support team for a financial institution such as a bank, specialists need to be trained to handle issues for all of the financial instruments and products that a customer may carry. Additional business objectives include training specialists to be expert across the breadth of products and services as quickly as possible. In this aspect, highly capable specialists are best able to handle the needs of customers.

Because of the voice-only interaction of telephone support, it can be challenging for an agent to ascertain when all customers needs have been satisfied during an interaction. A key problem is to eliminate repeat calls from customers who were uncertain of the resolution at the end of the first conversation, as such repeat calls represent missed opportunities for agents to solve on the first call, diminished customer experience, and additional business costs to maintain customer support.

Accordingly, there is a need for a method for managing call queues for recurring customer questions and inquiries so as to decrease a likelihood of additional calls regarding the same issues and thereby improve customer experience while reducing an overall call volume.

SUMMARY

The present disclosure, through one or more of its various aspects, embodiments, and/or specific features or sub-components, provides, inter alia, various systems, servers, devices, methods, media, programs, and platforms for methods and systems for managing call queues for recurring customer questions and inquiries so as to decrease a likelihood of additional calls regarding the same issues and thereby improve customer experience while reducing an overall call volume.

According to an aspect of the present disclosure, a method for handling a telephone call is provided. The method is implemented by at least one processor. The method includes: receiving, by the at least one processor, a first incoming telephone call from a person; capturing, by the at least one processor from the first incoming telephone call, an audio signal that corresponds to a voice of the person; analyzing, by the at least one processor, the captured audio signal; and determining, by the at least one processor based on a result of the analyzing, whether an inquiry articulated by the person during the first incoming telephone call has been adequately addressed.

The analyzing of the captured audio signal may include detecting at least one phonetic intonation included in the audio signal and applying at least one digital filter to the at least one phonetic intonation.

The determining may include using a result of the applying of the at least one digital filter to the at least one phonetic intonation to determine when the at least one phonetic intonation corresponds to a statement being made by the person and to determine when the at least one phonetic intonation corresponds to a question being asked by the person.

The method may further include: obtaining call data that relates to the first incoming telephone call; and executing a first artificial intelligence (AI) algorithm that implements a machine learning technique and uses the result of the applying of the at least one digital filter to the at least one phonetic intonation and the obtained call data as inputs in order to generate an output that indicates a sentiment of the person.

The sentiment may include at least one from among a certainty, an uncertainty, an anger, and a satisfaction.

The call data may include at least one from among a length of the first incoming telephone call, an amount of time that had elapsed from an occurrence of a prior incoming call from the person to the receiving of the first incoming telephone call, and a frequency of incoming calls from the person.

The method may further include using a result of the executing of the first AI algorithm to generate a numerical score that relates to a likelihood that a second incoming telephone call is received from the person within a predetermined amount of time after the first incoming telephone call has been completed.

The predetermined amount of time may include one from among one hour, 24 hours, and one week.

The method may further include: executing a second artificial intelligence (AI) algorithm that implements a machine learning technique and uses the obtained call data, the output that indicates a sentiment of the person, and the numerical score as inputs in order to generate a recommendation that relates to at least one potential action to be performed with respect to the person; and displaying, via a graphical user interface (GUI), information that relates to each of the obtained call data, the output that indicates a sentiment of the person, the numerical score, and the recommendation.

According to another exemplary embodiment, a computing apparatus for handling a telephone call is provided. The computing apparatus includes a processor; a memory; a display; and a communication interface coupled to each of the processor, the memory, and the display. The processor is configured to: receive, via the communication interface, a first incoming telephone call from a person; capture, from the first incoming telephone call, an audio signal that corresponds to a voice of the person; analyze the captured audio signal; and determine, based on a result of the analysis, whether an inquiry articulated by the person during the first incoming telephone call has been adequately addressed.

The processor may be further configured to detect at least one phonetic intonation included in the audio signal and apply at least one digital filter to the at least one phonetic intonation.

The processor may be further configured to use a result of the application of the at least one digital filter to the at least one phonetic intonation to determine when the at least one phonetic intonation corresponds to a statement being made by the person and to determine when the at least one phonetic intonation corresponds to a question being asked by the person.

The processor may be further configured to: obtain call data that relates to the first incoming telephone call; and execute a first artificial intelligence (AI) algorithm that implements a machine learning technique and uses the result of the applying of the at least one digital filter to the at least one phonetic intonation and the obtained call data as inputs in order to generate an output that indicates a sentiment of the person.

The sentiment may include at least one from among a certainty, an uncertainty, an anger, and a satisfaction.

The call data may include at least one from among a length of the first incoming telephone call, an amount of time that had elapsed from an occurrence of a prior incoming call from the person to the receiving of the first incoming telephone call, and a frequency of incoming calls from the person.

The processor may be further configured to use a result of the execution of the first AI algorithm to generate a numerical score that relates to a likelihood that a second incoming telephone call is received from the person within a predetermined amount of time after the first incoming telephone call has been completed.

The predetermined amount of time may include one from among one hour, 24 hours, and one week.

The processor may be further configured to: execute a second artificial intelligence (AI) algorithm that implements a machine learning technique and uses the obtained call data, the output that indicates a sentiment of the person, and the numerical score as inputs in order to generate a recommendation that relates to at least one potential action to be performed with respect to the person; and cause the display to display, via a graphical user interface (GUI), information that relates to each of the obtained call data, the output that indicates a sentiment of the person, the numerical score, and the recommendation.

According to yet another exemplary embodiment, a non-transitory computer readable storage medium storing instructions for handling a telephone call is provided. The storage medium includes executable code which, when executed by a processor, causes the processor to: receive a first incoming telephone call from a person; capture, from the first incoming telephone call, an audio signal that corresponds to a voice of the person; analyze the captured audio signal; and determine, based on a result of the analysis, whether an inquiry articulated by the person during the first incoming telephone call has been adequately addressed.

When executed by the processor, the executable code may further cause the processor to detect at least one phonetic intonation included in the audio signal and apply at least one digital filter to the at least one phonetic intonation.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 6 is a data flow diagram that illustrates a training workflow that occurs in the performance of a method for managing call queues for recurring customer questions and inquiries so as to decrease a likelihood of additional calls regarding the same issues and thereby improve customer experience while reducing an overall call volume, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
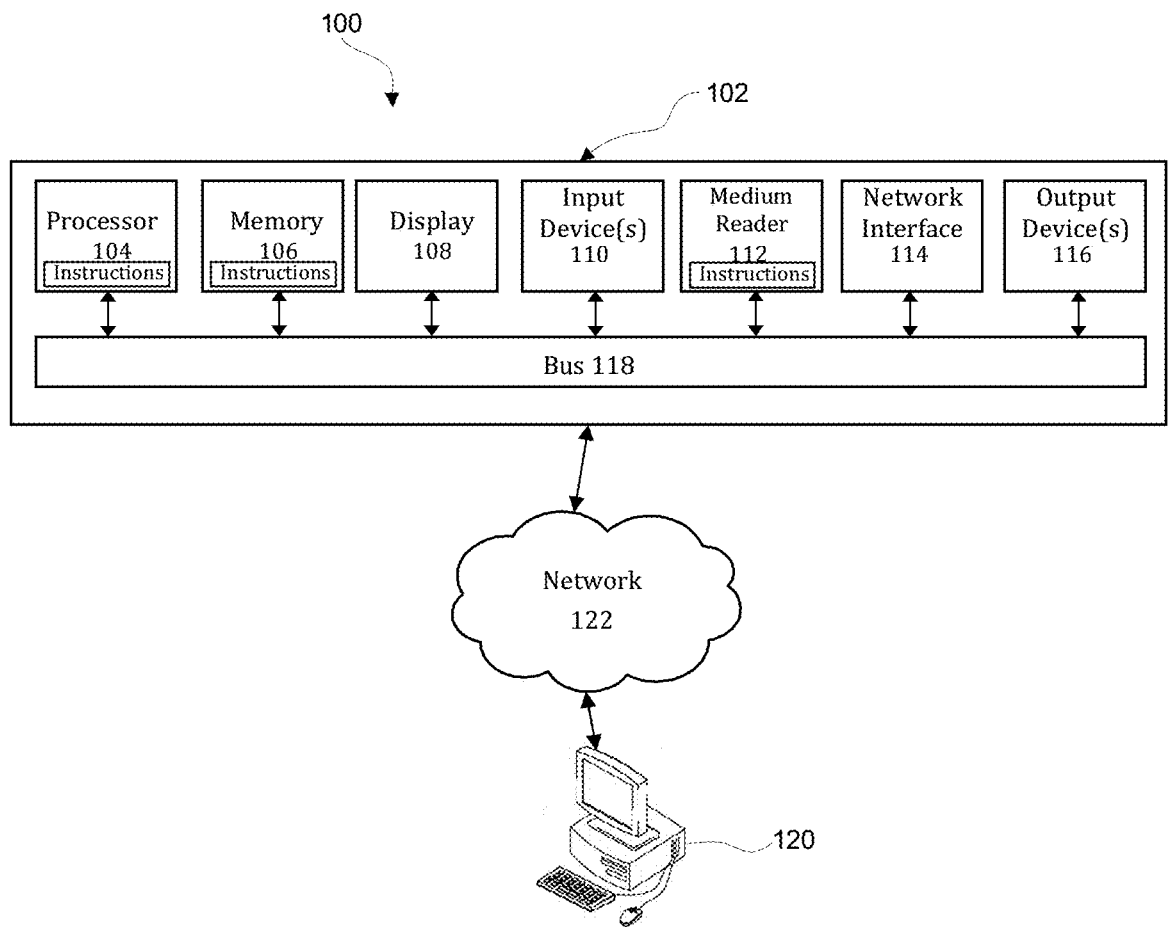
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for managing call queues for recurring customer questions and inquiries so as to decrease a likelihood of additional calls regarding the same issues and thereby improve customer experience while reducing an overall call volume.

Figure 2:
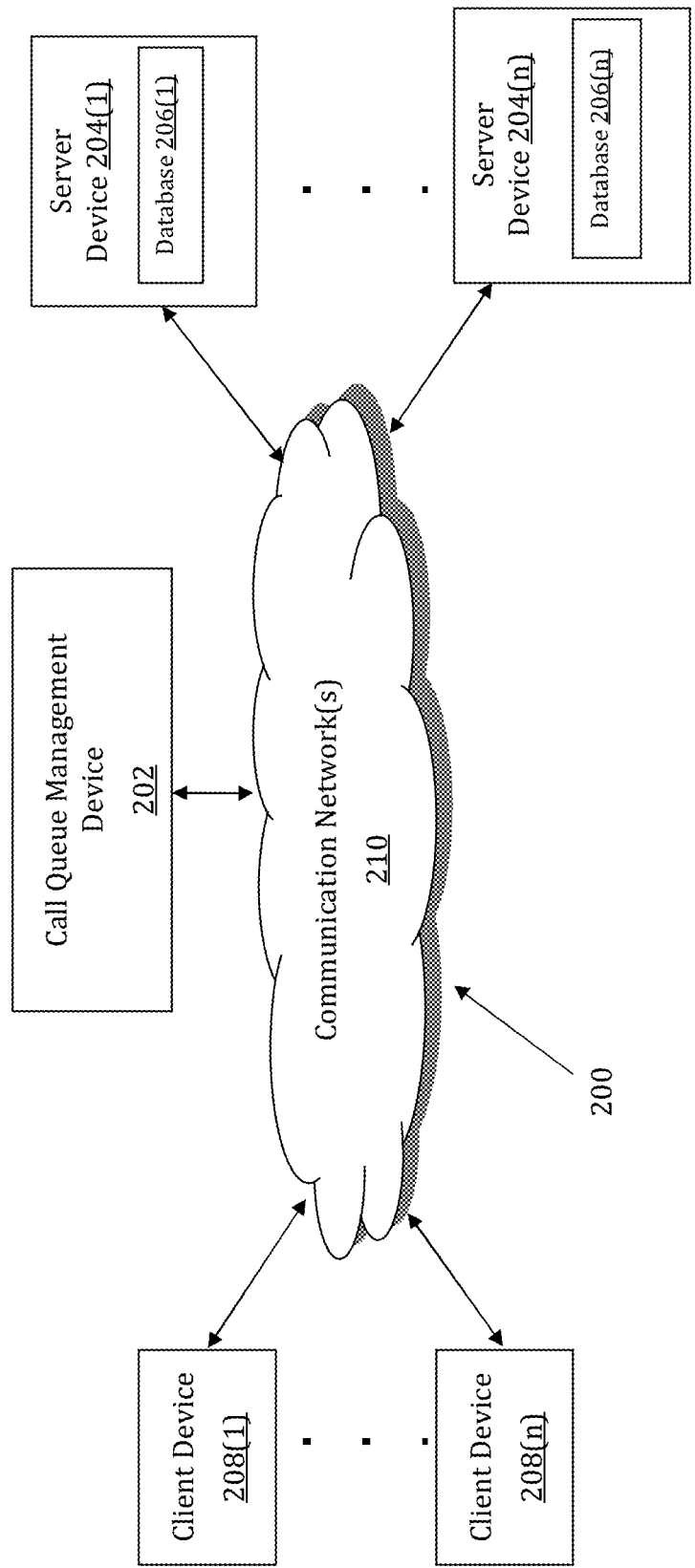
FIG. 2 illustrates an exemplary diagram of a network environment.

Referring to FIG. 2, a schematic of an exemplary network environment 200 for implementing a method for managing call queues for recurring customer questions and inquiries so as to decrease a likelihood of additional calls regarding the same issues and thereby improve customer experience while reducing an overall call volume is illustrated. In an exemplary embodiment, the method is executable on any networked computer platform, such as, for example, a personal computer (PC).

The method for managing call queues for recurring customer questions and inquiries so as to decrease a likelihood of additional calls regarding the same issues and thereby improve customer experience while reducing an overall call volume may be implemented by a Call Queue Management (CQM) device 202. The CQM device 202 may be the same or similar to the computer system 102 as described with respect to FIG. 1. The CQM device 202 may store one or more applications that can include executable instructions that, when executed by the CQM device 202, cause the CQM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CQM device 202 itself, may be located in virtual server(s) running in a cloud-based computing environment rather than being tied to one or more specific physical network computing devices. Also, the application(s) may be running in one or more virtual machines (VMs) executing on the CQM device 202. Additionally, in one or more embodiments of this technology, virtual machine(s) running on the CQM device 202 may be managed or supervised by a hypervisor.

In the network environment 200 of FIG. 2, the CQM device 202 is coupled to a plurality of server devices 204(1)-204(n) that hosts a plurality of databases 206(1)-206(n), and also to a plurality of client devices 208(1)-208(n) via communication network(s) 210. A communication interface of the CQM device 202, such as the network interface 114 of the computer system 102 of FIG. 1, operatively couples and communicates between the CQM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CQM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and CQM devices that efficiently implement a method for managing call queues for recurring customer questions and inquiries so as to decrease a likelihood of additional calls regarding the same issues and thereby improve customer experience while reducing an overall call volume.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CQM device 202 may be a standalone device or integrated with one or more other devices or apparatuses, such as one or more of the server devices 204(1)-204(n), for example. In one particular example, the CQM device 202 may include or be hosted by one of the server devices 204(1)-204(n), and other arrangements are also possible.

Moreover, one or more of the devices of the CQM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ACP device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to individual customer accounts and information that relates to audio signals associated with telephone calls.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the CQM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the CQM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the CQM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CQM device 202, the server devices 204(1)-204(n), or the client devices 208(1)-208(n), for example, may be configured to operate as virtual instances on the same physical machine. In other words, one or more of the CQM device 202, the server devices 204(1)-204(n), or the client devices 208(1)-208(n) may operate on the same physical device rather than as separate devices communicating through communication network(s) 210. Additionally, there may be more or fewer CQM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
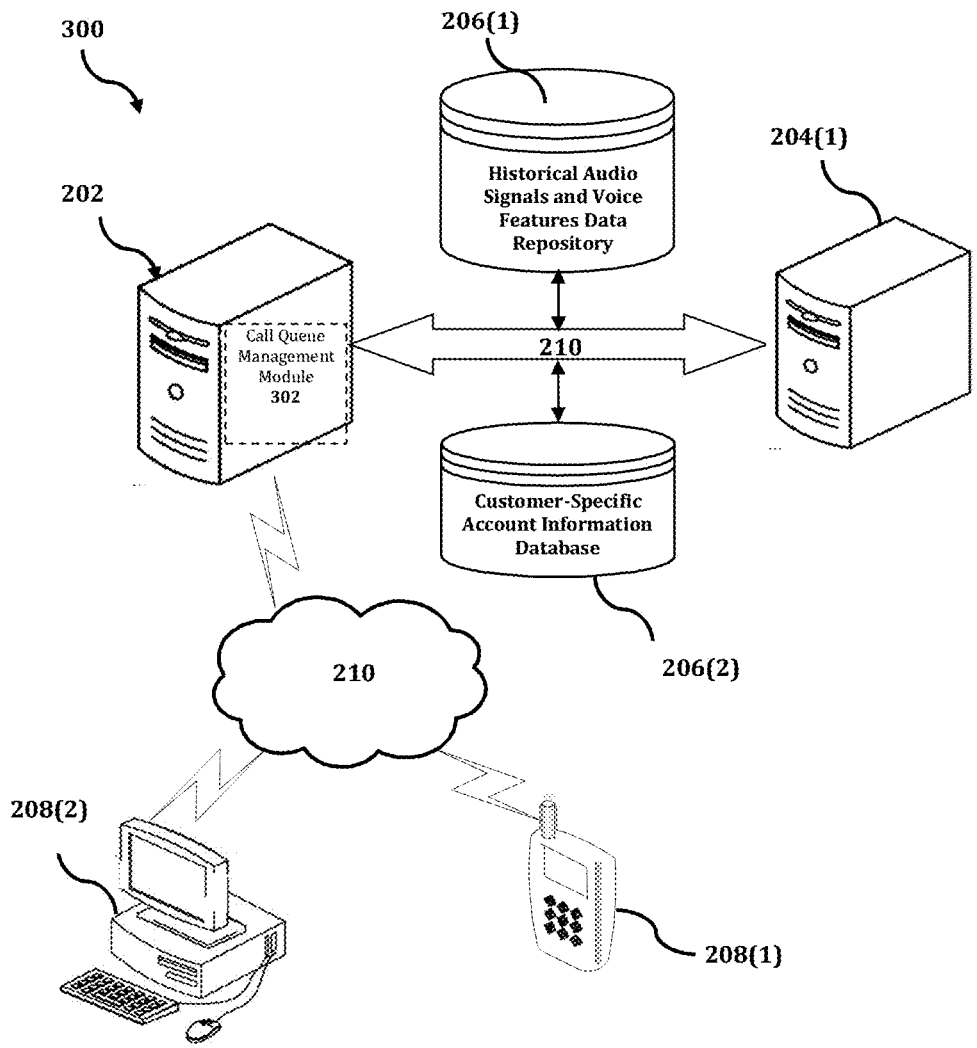
FIG. 3 shows an exemplary system for implementing a method for managing call queues for recurring customer questions and inquiries so as to decrease a likelihood of additional calls regarding the same issues and thereby improve customer experience while reducing an overall call volume.

The CQM device 202 is described and illustrated in FIG. 3 as including a call queue management module 302, although it may include other rules, policies, modules, databases, or applications, for example. As will be described below, the call queue management module 302 is configured to implement a method for managing call queues for recurring customer questions and inquiries so as to decrease a likelihood of additional calls regarding the same issues and thereby improve customer experience while reducing an overall call volume.

An exemplary process 300 for implementing a mechanism for managing call queues for recurring customer questions and inquiries so as to decrease a likelihood of additional calls regarding the same issues and thereby improve customer experience while reducing an overall call volume by utilizing the network environment of FIG. 2 is illustrated as being executed in FIG. 3. Specifically, a first client device 208(1) and a second client device 208(2) are illustrated as being in communication with CQM device 202. In this regard, the first client device 208(1) and the second client device 208(2) may be "clients" of the CQM device 202 and are described herein as such. Nevertheless, it is to be known and understood that the first client device 208(1) and/or the second client device 208(2) need not necessarily be "clients" of the CQM device 202, or any entity described in association therewith herein. Any additional or alternative relationship may exist between either or both of the first client device 208(1) and the second client device 208(2) and the CQM device 202, or no relationship may exist.

Further, CQM device 202 is illustrated as being able to access a historical audio signals and voice features data repository 206(1) and a customer-specific account information database 206(2). The call queue management module 302 may be configured to access these databases for implementing a method for managing call queues for recurring customer questions and inquiries so as to decrease a likelihood of additional calls regarding the same issues and thereby improve customer experience while reducing an overall call volume.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the CQM device 202 via broadband or cellular communication. Of course, these embodiments are merely exemplary and are not limiting or exhaustive.

Upon being started, the call queue management module 302 executes a process for managing call queues for recurring customer questions and inquiries so as to decrease a likelihood of additional calls regarding the same issues and thereby improve customer experience while reducing an overall call volume. An exemplary process for managing call queues for recurring customer questions and inquiries so as to decrease a likelihood of additional calls regarding the same issues and thereby improve customer experience while reducing an overall call volume is generally indicated at flowchart 400 in FIG. 4.

Figure 4:
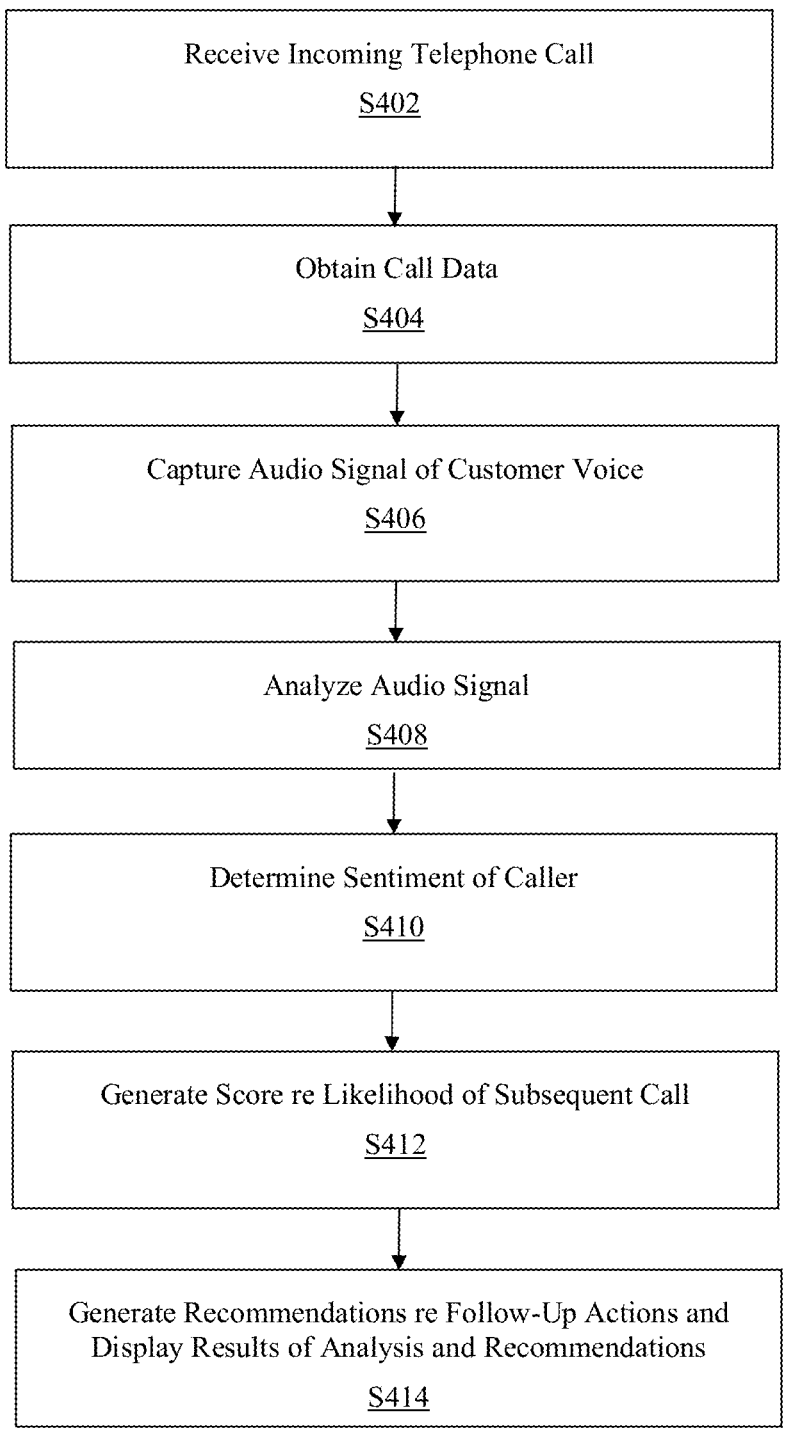
FIG. 4 is a flowchart of an exemplary process for implementing a method for managing call queues for recurring customer questions and inquiries so as to decrease a likelihood of additional calls regarding the same issues and thereby improve customer experience while reducing an overall call volume.

In process 400 of FIG. 4, at step S402, the call queue management module 302 receives an incoming telephone call from a person, such as, for example a customer. Then, at step S404, the call queue management module 302 obtains call data that relates to the incoming telephone call. In an exemplary embodiment, the call data may include any one or more of a length of the call, a length of a conversation, an amount of time that had elapsed since a previous incoming call was received from the person, and/or a frequency of incoming calls received from the person.

At step S406, the call queue management module 302 captures an audio signal that corresponds to a voice of the person. In an exemplary embodiment, the capturing of the audio signal is performed by recording the telephone call.

At step S408, the call queue management module 302 analyzes the captured audio signal. In an exemplary embodiment, the analysis includes detecting phonetic intonations included in the audio signal and then applying one or more digital filters to the audio signal in order to extract a time property and/or a frequency property of the audio signal. In an exemplary embodiment, the analysis of the phonetic intonations may indicate that in some instances, the person is asking a question, and that in some other instances, the person is making a statement.

At step S410, the call queue management module 302 determines a sentiment of the person (i.e., the caller). In an exemplary embodiment, the sentiment is indicated by an output of an artificial intelligence (AI) algorithm that implements a machine learning technique and uses the call data and the results of the analysis of the audio signal as inputs.

The AI algorithm may be trained by using historical call data and historical audio signal data that has been collected from many incoming calls involving many different callers. The sentiment may include, for example, any one or more of a certainty or an uncertainty of the person; an angry sentiment; and/or a sentiment that corresponds to satisfaction.

At step S412, the call queue management module 302 generates a numerical score that corresponds to a probability or a likelihood that another incoming call will be received from the same person within a predetermined time period, such as, for example, within the next 24 hours. The predetermined time period may be, for example, one hour, one day, one week, or any other suitable amount of time. In an exemplary embodiment, the score may be generated by executing another AI algorithm that implements a machine learning technique and uses the call data and the results of the analysis of the audio signal as inputs. The AI algorithm may be trained by using historical call data and historical audio signal data that has been collected from many incoming calls involving many different callers. In an exemplary embodiment, the score may be normalized so that it falls within a predetermined range, such as, for example, between zero (0) and one hundred (100) so as to readily indicate a percentage probability that a subsequent telephone call will be received from the same person.

At step S414, the call queue management module 302 generates recommendations regarding possible actions to be taken in order to reduce the likelihood of a subsequent telephone call, and then displays the recommendations so that a customer service agent is able to see the recommendations. In an exemplary embodiment, the recommendations may be displayed on a screen via a graphical user interface (GUI) in conjunction with other relevant information about the caller in order to assist the customer service agent in addressing the questions, inquiries, and/or concerns raised by the caller. As a result, the agent may be better able to provide an answer and/or a response that is satisfactory, thereby decreasing the likelihood that a subsequent call will be received from the same person in a relatively short amount of time.

In an exemplary embodiment, a method for managing call queues for recurring customer questions and inquiries estimates customer uncertainty from voice and conversation features, uses these estimates to estimate a likelihood of a return call, and manages call queues based on these estimates and return call volume estimates. In this method, voice features are phonetic intonations detected in the audio signal; these are the intonations that are made when asking a question versus making a statement. The method recovers the phonetic segments of words spoken by the caller and then applies digital filters to the audio signals of those segments. The filters recover the time and frequency properties of the spoken segments.

In an exemplary embodiment, the method entails the use of an AI algorithm that is trained to detect uncertainty from labeled conversational data, which include audio recordings of speakers (i.e., individual persons) in conversations that have been identified to have been uncertain of a resolution and of speakers in conversations that have been identified to be certain of a resolution. A system that implements this method trains a long, short term memory (LSTM) neural network learning system to detect the differences between the two sets of speaker data, i.e., the first set that corresponds to uncertainty and the second set that corresponds to certainty. The motivation for using an LSTM model is that uncertainty appears to have a temporal component to its expression in audio signals, and thus, an LSTM model is useful for associating features of the conversation over time. The inputs to the LSTM model include the sequence of digitally filtered phonetic segments of the spoken words. At the end of the sequence, the model generates a likelihood score that the speaker is uncertain.

Once the uncertainty model is trained, the system trains a model that estimates a likelihood that the customer will make a return call within 24 hours of the current time. In an exemplary embodiment, this model is a Gradient Boosted Machine (GBM) model, for which the inputs to model include customer-specific data, such as estimates of uncertainty from a most recent conversation that the customer previously had, together with the length of the conversation and the span of time since the last conversation, and the frequency of conversations that the customer has had. Table 1 below provides a listing of various types of customer-specific data that may be used by the GBM model:

TABLE 1

| Data Name | Data Type | Description |
| --- | --- | --- |
| Customer_id | Text string | Unique customer identifier |
| Cx_uncertainty_prev_conv | Number | Uncertainty prediction from last conversation |
| Last_conversation_ts | | Number of seconds between last conversation and current time |
| Cx_prev_conv_cnt | | Number of previous conversations in last 24 hours with same intents |
| Avg_time_between_conv | | Average number of seconds between conversations |
| Cl_avg_time_between_conv low | | 95% confidence interval low for average time |
| Cl_avg_time_between_conv_high | | 95% confidence interval high for average time |
| Cur_time_span_within_Cl | | Time since the last conversation within the 95% Cl time span |
| Last_conversation_len | | Length of last conversation in seconds |
| Cs_avg_uncertainty | | Average of uncertainty score for previous Cx conversations |
| Cx_uncertainty_Cl_low | | 95% confidence interval low for Cx uncertainty |
| Cx_uncertainty_Cl high | | 95% confidence interval high for Cx uncertainty |
| Cx_prev_contacts_cnt | | Number of previous contacts in other channels (chat or online) customer had in previous 24 hours |
| Cx_prev_meta_transactions_cnt | | Number of previous actions customers have taken with their accounts or products in previous 7 days |

This model is trained using historical labeled data as well, where the target label is whether the customer made a call within the following 24 hours. In an exemplary embodiment, the system uses these models on a daily basis to generate predictions of return call volumes for the day. Each day, the system evaluates each customer for their uncertainty score as well as their likelihood to make a return call within the next 24 hours. The output of these estimates is a count of the number of expected return calls for the day. This call volume estimate may be used to estimate the number of call center representatives need to handle the return call volume for the day.

In an exemplary embodiment, the system also provides each agent with customer uncertainty details data in the moment while on the call with the customer. The system displays the uncertainty data of the customer together with recommended actions for that customer. The recommended actions are generated through a system that maps actions to successful outcomes for similar customers in the past. These recommendations may include specific phrases that a specialist can use during the customer conversation aimed at providing clarifying details to uncertain customers.

In an exemplary embodiment, the system that implements the methodology described above provides several benefits, including the following: 1) Being able to estimate and manage repeat calls, which is important in the customer car business arena; 2) being able to anticipate call volumes, thereby allowing for better scheduling of agent capacity; 3) being able to anticipate reasons for return calls, thereby increasing load estimates; and 4) being able to coach agents on customer uncertainty in order to improve resolutions and prevent return calls.

Figure 5:
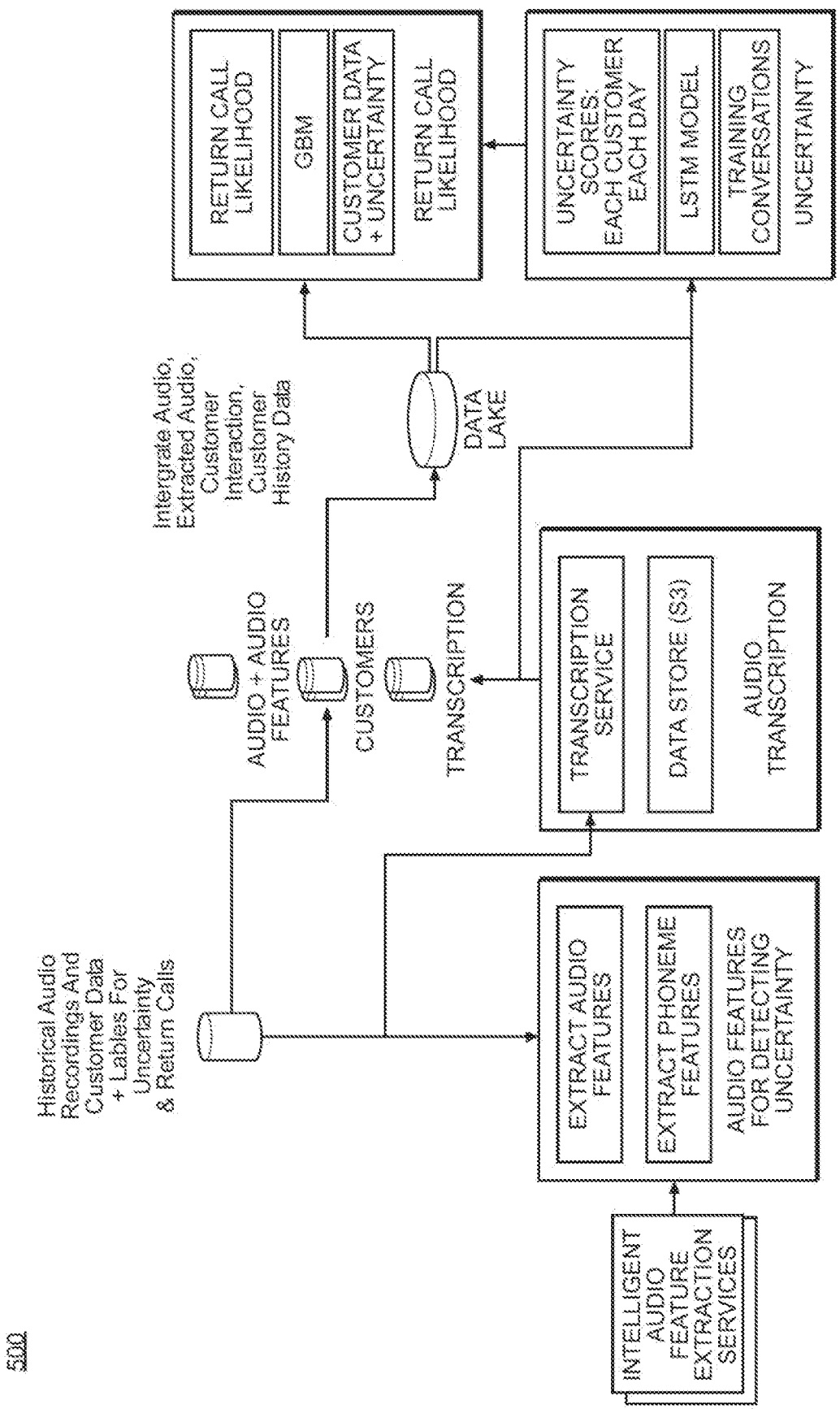
FIG. 5 is a data flow diagram that illustrates a serving workflow that occurs in the performance of a method for managing call queues for recurring customer questions and inquiries so as to decrease a likelihood of additional calls regarding the same issues and thereby improve customer experience while reducing an overall call volume, according to an exemplary embodiment.

FIG. 5 is a data flow diagram 500 that illustrates a serving workflow that occurs in the performance of a method for managing call queues for recurring customer questions and inquiries so as to decrease a likelihood of additional calls regarding the same issues and thereby improve customer experience while reducing an overall call volume, according to an exemplary embodiment.

As illustrated in data flow diagram 500, an intelligent audio feature extraction service component feeds incoming audio signal data into an audio features for detecting uncertainty component, which also receives an input from a database that stores historical audio recordings and customer data with labels for uncertainty and return calls. The audio features for detecting uncertainty component then extracts audio features and also extracts phoneme features from the audio signal data.

Referring again to data flow diagram 500, the input from the database that stores historical audio recordings and customer data with labels for uncertainty and return calls is also fed to both a customer terminal and an audio transcription component. The audio transcription component operates thereon using a transcription service and a data store, and then forwards an output thereof to a transcriptions terminal, a data lake, and an uncertainty component. The uncertainty component is trained using historical, labelled conversation data; the conversation model is a long short-term memory (LSTM) model, and the output of the model is an uncertainty score for each conversation provided to the model as an input. Finally, the outputs of the uncertainty component are provided as inputs to a return call likelihood component. The return call likelihood component also receives integrated audio data, extracted audio data, customer interaction data, and customer history data from the data lake, and uses these inputs to generate a return call likelihood, a Gradient Boosted Machine (GBM) model output, and a customer data-plus-uncertainty output.

FIG. 6 is a data flow diagram 600 that illustrates a training workflow that occurs in the performance of a method for managing call queues for recurring customer questions and inquiries so as to decrease a likelihood of additional calls regarding the same issues and thereby improve customer experience while reducing an overall call volume, according to an exemplary embodiment.

As illustrated in data flow diagram 600, the workflow commences with an incoming telephone call that is received from a customer by a call routing component. The call routing component uses daily estimates of return call volumes to route a customer that is making a return call to a secure conversation gateway component that acts as a streaming service for audio data. An output of the secure conversation gateway component and an output of an intelligent audio feature extraction services component are then provided as inputs to the audio features for detecting uncertainty component, which uses these inputs to extract audio features and phoneme features. The output of the secure conversation gateway component is also fed to the audio transcription component, which operates thereon by using the transcription service and the data store and then feeds its output to the transcriptions terminal and to the data lake. The data lake also receives inputs from a user information terminal and a regulation information terminal.

Referring again to data flow diagram 600, the data lake provides input to a feature extraction component, which operates thereon by using a text/transcription functionality, an audio/signal processing functionality, and a content processor technology. An output of the feature extraction component is provided as input to an integration-analyzer component, which operates on this input by using a machine learning model, an inference engine, and a rules engine. An output of the integration-analyzer component is provided as an input to an agent-guidance service component, which also receives the output of the audio features for detecting uncertainty component as another input. The agent-guidance service component uses these inputs to generate an uncertainty score and recommended actions, and then forwards this information to an agent terminal for display on a user interface. In this manner, when a customer makes a return call and has uncertainty from a previous call, the agent-guidance service component recommends agent actions in the moment in an attempt to resolve the customer uncertainty.

Accordingly, with this technology, an optimized process for managing call queues for recurring customer questions and inquiries so as to decrease a likelihood of additional calls regarding the same issues and thereby improve customer experience while reducing an overall call volume is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for handling a telephone call, the method being implemented by at least one processor, the method comprising:
   receiving, by the at least one processor, a first incoming telephone call from a person;
   capturing, by the at least one processor from the first incoming telephone call, an audio signal that corresponds to a voice of the person;
   analyzing, by the at least one processor, the captured audio signal; and
   determining, by the at least one processor based on a result of the analyzing, whether an inquiry articulated by the person during the first incoming telephone call has been adequately addressed,
   wherein the analyzing of the captured audio signal comprises detecting at least one phonetic intonation included in the audio signal and applying at least one digital filter to the at least one phonetic intonation, and
   wherein the determining comprises using a result of the applying of the at least one digital filter to the at least one phonetic intonation to determine when the at least one phonetic intonation corresponds to a statement being made by the person and to determine when the at least one phonetic intonation corresponds to a question being asked by the person, and
   wherein the method further comprises:
   obtaining call data that relates to the first incoming telephone call; and
   executing a first artificial intelligence (AI) algorithm that implements a machine learning technique and uses the result of the applying of the at least one digital filter to the at least one phonetic intonation and the obtained call data as inputs in order to generate an output that indicates a sentiment of the person.

2. The method of claim 1, wherein the sentiment includes at least one from among a certainty, an uncertainty, an anger, and a satisfaction.

3. The method of claim 1, wherein the call data includes at least one from among a length of the first incoming telephone call, an amount of time that had elapsed from an occurrence of a prior incoming call from the person to the receiving of the first incoming telephone call, and a frequency of incoming calls from the person.

4. The method of claim 1, further comprising using a result of the executing of the first AI algorithm to generate a numerical score that relates to a likelihood that a second incoming telephone call is received from the person within a predetermined amount of time after the first incoming telephone call has been completed.

5. The method of claim 4, wherein the predetermined amount of time includes one from among one hour, 24 hours, and one week.

6. The method of claim 4, further comprising:
   executing a second artificial intelligence (AI) algorithm that implements a machine learning technique and uses the obtained call data, the output that indicates a sentiment of the person, and the numerical score as inputs in order to generate a recommendation that relates to at least one potential action to be performed with respect to the person; and
   displaying, via a graphical user interface (GUI), information that relates to each of the obtained call data, the output that indicates a sentiment of the person, the numerical score, and the recommendation.

7. A computing apparatus for handling a telephone call, the computing apparatus comprising:
   a processor;
   a memory;
   a display; and
   a communication interface coupled to each of the processor, the memory, and the display,
   wherein the processor is configured to:
   receive, via the communication interface, a first incoming telephone call from a person;
   capture, from the first incoming telephone call, an audio signal that corresponds to a voice of the person;
   analyze the captured audio signal; and
   determine, based on a result of the analysis, whether an inquiry articulated by the person during the first incoming telephone call has been adequately addressed,
   wherein the processor is further configured to detect at least one phonetic intonation included in the audio signal and apply at least one digital filter to the at least one phonetic intonation, and
   wherein the processor is further configured to use a result of the application of the at least one digital filter to the at least one phonetic intonation to determine when the at least one phonetic intonation corresponds to a statement being made by the person and to determine when the at least one phonetic intonation corresponds to a question being asked by the person, and
   wherein the processor is further configured to:
   obtain call data that relates to the first incoming telephone call; and
   execute a first artificial intelligence (AI) algorithm that implements a machine learning technique and uses the result of the applying of the at least one digital filter to the at least one phonetic intonation and the obtained call data as inputs in order to generate an output that indicates a sentiment of the person.

8. The computing apparatus of claim 7, wherein the sentiment includes at least one from among a certainty, an uncertainty, an anger, and a satisfaction.

9. The computing apparatus of claim 7, wherein the call data includes at least one from among a length of the first incoming telephone call, an amount of time that had elapsed from an occurrence of a prior incoming call from the person to the receiving of the first incoming telephone call, and a frequency of incoming calls from the person.

10. The computing apparatus of claim 7, wherein the processor is further configured to use a result of the execution of the first AI algorithm to generate a numerical score that relates to a likelihood that a second incoming telephone call is received from the person within a predetermined amount of time after the first incoming telephone call has been completed.

11. The computing apparatus of claim 10, wherein the predetermined amount of time includes one from among one hour, 24 hours, and one week.

12. The computing apparatus of claim 10, wherein the processor is further configured to:

execute a second artificial intelligence (AI) algorithm that implements a machine learning technique and uses the obtained call data, the output that indicates a sentiment of the person, and the numerical score as inputs in order to generate a recommendation that relates to at least one potential action to be performed with respect to the person; and cause the display to display, via a graphical user interface (GUI), information that relates to each of the obtained call data, the output that indicates a sentiment of the person, the numerical score, and the recommendation.

13. A non-transitory computer readable storage medium storing instructions for handling a telephone call, the storage medium comprising executable code which, when executed by a processor, causes the processor to:

receive a first incoming telephone call from a person;

capture, from the first incoming telephone call, an audio signal that corresponds to a voice of the person;

analyze the captured audio signal; and determine, based on a result of the analysis, whether an inquiry articulated by the person during the first incoming telephone call has been adequately addressed, wherein the executable code further causes the processor to analyze the captured audio signal by detecting at least one phonetic intonation included in the audio signal and applying at least one digital filter to the at least one phonetic intonation, and wherein the executable code further causes the processor to determine whether the inquiry has been adequately addressed by using a result of the applying of the at least one digital filter to the at least one phonetic intonation to determine when the at least one phonetic intonation corresponds to a statement being made by the person and to determine when the at least one phonetic intonation corresponds to a question being asked by the person, and wherein the executable code further causes the processor to:

obtain call data that relates to the first incoming telephone call; and execute a first artificial intelligence (AI) algorithm that implements a machine learning technique and uses the result of the applying of the at least one digital filter to the at least one phonetic intonation and the obtained call data as inputs in order to generate an output that indicates a sentiment of the person.

* * * * *